United States Patent
Popov et al.

(10) Patent No.: US 6,350,351 B1
(45) Date of Patent: Feb. 26, 2002

(54) PLANT FOR THE VACUUM DISTILLATION OF A LIQUID PRODUCT

(75) Inventors: Serguei A. Popov, 11707 S. Sam Houston Pkwy. W., suite R, Houston, TX (US) 77031; Mikhail V. Akimov, Moscow (RU)

(73) Assignees: Evgueni D. Petroukhine, Limassol (CY); Serguei A. Popov, Budapest (HU)

( * ) Notice: Subject to any disclaimer, the term of this patent is extended or adjusted under 35 U.S.C. 154(b) by 0 days.

(21) Appl. No.: 09/402,749
(22) PCT Filed: Feb. 13, 1998
(86) PCT No.: PCT/RU98/00034
   § 371 Date: Oct. 12, 1999
   § 102(e) Date: Oct. 12, 1999
(87) PCT Pub. No.: WO99/40988
   PCT Pub. Date: Aug. 19, 1999
(51) Int. Cl.⁷ .............. B01D 3/10; C10G 7/06
(52) U.S. Cl. ........... 202/205; 202/182; 196/114; 203/DIG. 14; 208/357; 208/93
(58) Field of Search ........... 203/DIG. 14, DIG. 9, 203/91, 100; 208/93, 357; 202/205, 182, 197, 202; 196/114

(56) References Cited

U.S. PATENT DOCUMENTS 2,680,709 A    6/1954    Skinner
5,935,388 A  * 8/1999    Meszaros ............ 203/DIG. 14

FOREIGN PATENT DOCUMENTS

| RU | 2048156 | 11/1995 |
| RU | 2083638 | 7/1997 |
| RU | 2095392 | 11/1997 |
| RU | 2102102 | 1/1998 |
| WO | WO 96/16711 | 6/1996 |

* cited by examiner

Primary Examiner—Virginia Manoharan
(74) Attorney, Agent, or Firm—Mark A. Oathout

(57) ABSTRACT

A plant for the vacuum distillation of liquids has a vacuum rectification column and a vacuum-producing device based on a liquid-gas jet apparatus. The plant is furnished additionally with a jet pump. A nozzle of the jet pump is connected to a pipeline for bleeding a liquid fraction from the column, an evacuated medium inlet of the jet pump is connected to an outlet of the liquid-gas jet apparatus and an outlet of the jet pump is connected to a separator of the vacuum-producing device. The plant provides more effective vacuum distillation of liquids.

2 Claims, 1 Drawing Sheet

PLANT FOR THE VACUUM DISTILLATION OF A LIQUID PRODUCT

This application is a 371 of International Application PCT/RU98/00034 filed Feb. 13, 1998 (not published in English).

BACKGROUND

This invention pertains to the field of oil refining and the petrochemical industry, and more particularly to installations for the vacuum distillation of liquids, such as crude oil for example. The invention can be used for the rectification of an oil stock.

An installation for distilling a liquid product is known, which has a vacuum rectification column and a steam-driven jet apparatus producing a vacuum in the column (see U.S. Pat. No. 2,680,709, cl. 202–204, 1954).

The main imperfections of this installation are contamination of a base product with water and partial entrainment of the base product with the motive steam conducing, in its turn, to contamination of the steam. These operational features reduce the efficiency of the installation.

A plant for the distillation of a liquid product disclosed in RU patent No. 2048156 has been chosen as the starting point for the invention. The plant has a vacuum rectification column with pipes for feeding a stock product and for bleeding a gas-vapor phase and at least one liquid fraction. Further the plant has a vacuum-producing device composed of a liquid-gas jet apparatus whose gas intake is connected to the pipeline for bleeding a gas-vapor phase, a pump whose discharge side is connected to the liquid inlet of the jet apparatus and a separator connected to the suction side of the pump and furnished with a pipeline for discharge of a compressed gas (see RU patent No. 2048156, cl., B 01 D 3/10, 1995).

In this plant condensation of condensable components of the gas-vapor phase takes place during evacuation of the gas-vapor phase from the rectification column because a motive liquid medium of the vacuum-producing device and the gas-vapor phase are cognate mediums. Environmental pollution is minimal in this case.

An imperfection of the plant is the practical impossibility of ensuring complete condensation of the condensable vapor components prior to entry of a mixture of mediums into the separator, i.e. during mixing of the mediums in the jet apparatus. Although the complete condensation is theoretically possible, it is very hard-to-reach in this plant. Additionally, optimum renewal of the motive liquid medium circulating in the vacuum-producing device is not ensured when the liquid fraction is fed from the rectification column to the separator. The latter reduces efficiency of the liquid-gas jet apparatus.

SUMMARY OF THE INVENTION

The present invention is aimed at an increase in efficiency of the plant for the vacuum distillation of a liquid product due to more optimal renewal of a liquid medium circulating in the vacuum-producing device of the plant, more intensive condensation of a gas-vapor phase and providing favorable conditions for completion of the condensation process during mixing of the liquid medium and gas-vapor phase prior to entry of the mixture of mediums into the separator of the plant.

The stated objective of the invention is achieved because the plant for the vacuum distillation of a liquid product, which has a vacuum rectification column with pipelines for feeding a stock product, for bleeding a gas-vapor phase and for bleeding at least one liquid fraction, a vacuum-producing device composed of a liquid-gas jet apparatus whose gas intake is connected to the pipeline for bleeding a gas-vapor phase, a pump whose discharge side is connected to the liquid intake of the jet apparatus, a separator connected to the suction side of the pump and furnished with a pipeline for discharging compressed gas, is furnished further with a jet pump. A nozzle of the jet pump is connected to the pipeline for bleeding the liquid fraction, an inlet of an evacuated medium of the jet pump is connected to an outlet of the liquid-gas jet apparatus and an outlet of the jet pump is connected to the separator. In addition, the plant can be furnished with an additional pump whose suction side is connected to the separator and discharge side is connected to the nozzle of the jet pump.

Experiments have proved that the availability of a jet pump in the contour of the circulation of a motive liquid and feeding a liquid fraction from the rectification column into a nozzle of the jet pump as an active medium improve simultaneously several parameters impacting efficiency of evacuation of a gas-vapor phase:

First, backpressure at the outlet of the liquid-gas jet apparatus is reduced, and consequently the evacuation capability of the apparatus is increased;

Secondly, mixing of the liquid working medium and the gas-vapor phase is intensified;

Thirdly, introduction of the liquid fraction into the contour of the circulation of the liquid working medium prior to entry of the liquid working medium into the separator provides for an entry of a more uniform mixture of mediums into the separator. As a result, the performance of the separator is optimized and the effectiveness of the degassing of the mixture in the separator rises.

DETAILED DESCRIPTION

Figure 1:
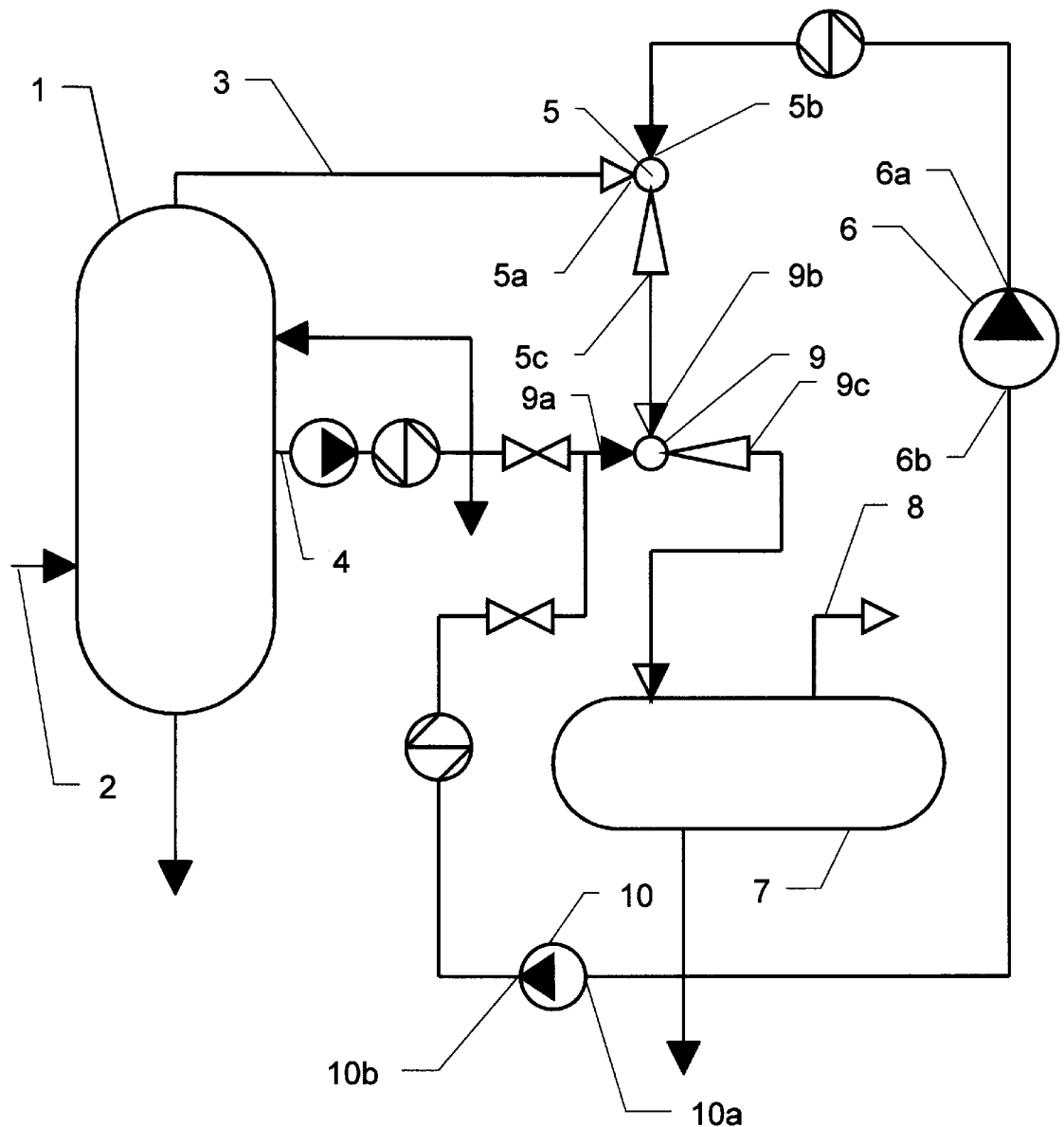
FIG. 1 represents a schematic diagram of the described plant for the vacuum distillation of a liquid product.

The plant for the vacuum distillation of a liquid product has a vacuum rectification column 1 with pipelines 2, 3, 4 respectively, for feeding a stock product, bleeding a gas-vapor phase and bleeding at least one liquid fraction, a vacuum-producing device composed of a liquid-gas jet apparatus 5 whose gas inlet 5a is connected to the pipeline 3 for bleeding a gas-vapor phase; a pump 6 whose discharge side 6a is connected to the liquid inlet 5b of the jet apparatus 5 and a separator 7 connected to the suction side 6b of the pump 6 and furnished with a pipeline 8 for discharging compressed gas. The plant is further furnished with a jet pump 9, whose nozzle 9a is connected to the pipeline 4 for bleeding a liquid fraction, an inlet 9b of an evacuated medium is connected to an outlet 5c of the liquid-gas jet apparatus 5 and an outlet 9c is connected to the separator 7. The plant can be furnished with an additional pump 10, whose suction side 10a is connected to the separator 7 and whose discharge side 10b is connected to the nozzle 9a of the jet pump 9.

The plant works as follows:

A liquid product passes through the pipeline 2 into the vacuum rectification column 1, where it is distillated into a gas-vapor phase and at least one liquid fraction. The gas-vapor phase is evacuated from the column 1 through the pipeline 3, and the liquid fraction is bled through the pipeline 4. A liquid working medium is delivered by the pump 6 from the separator 7 to a nozzle of the liquid-gas jet apparatus 5 through its liquid inlet. The liquid working medium flowing from the nozzle of the jet apparatus 5 entrains and evacuates the gas-vapor phase from the column 1 through the pipeline 3, thus maintaining a vacuum in the column 1. Mixing of the liquid working medium and the gas-vapor phase occurs in the jet apparatus 5. Condensation of condensable components of the gas-vapor phase and compression of non-condensable components take place during the mixing. Then the mixture of mediums is evacuated from the jet apparatus 5 by the jet pump 9 by the delivery of the liquid fraction from the column 1 through the pipeline 4 to the nozzle of the jet pump 9 as an active medium. In addition to the evacuation of the mixture of mediums from the jet apparatus 5, renewal of the liquid working medium circulating in the vacuum-producing device takes place during discharge of the liquid fraction from the nozzle of the jet pump 9. The mixing of the liquid working medium and gas-vapor phase is completed in the jet pump 9 and, at the same time, additional compression of non-condensable components of the gas-vapor phase occurs. Infusing the liquid working medium by the liquid fraction via pipeline 4 containing a liquid fraction having no gases dissolved in it stimulates the condensation of condensable components of the gas-vapor phase. Therefore, a more uniform gas-liquid mixture proceeds from the jet pump 9 to the separator 7 for degassing. The gas-liquid mixture is separated in the separator 7 into a compressed gas and the liquid working medium. The compressed gas is discharged through the pipeline 8. The liquid working medium is delivered again to the liquid inlet of the liquid-gas jet apparatus 5 by the pump 6. Additionally, a surplus amount of the liquid working medium appearing as a result of the delivery of the liquid fraction into the separator 7 from the jet pump 9 and as a result of condensation of condensable components of the gas-vapor phase in the liquid working medium is exported from the separator 7 as a base product (an output of the column 1).

The liquid working medium can be chilled, if necessary, while proceeding to the jet apparatus 5.

If it is not necessary to feed the liquid fraction into the vacuum-producing device or if only a relatively small amount of the liquid fraction must be introduced into the contour of the liquid working medium circulation, then the liquid working medium may be delivered to the nozzle of the jet pump 9 from the separator 7 by the additional pump 10.

Industrial applicability

The invention can be applied in technological processes or in industries, where the simultaneous creation and maintenance of a vacuum and the delivery of a product under an excessive pressure to consumers are required.

What is claimed is:

1. A plant for vacuum distillation of a liquid product, which comprises:

a vacuum rectification column having a pipeline for feeding a stock product, a pipeline for bleeding a gas-vapor phase and a pipeline for bleeding at least one liquid fraction;

a vacuum-producing device including a liquid-gas jet apparatus, a separator and a pump;

wherein a gas inlet of the liquid-gas jet apparatus is connected to the pipeline for bleeding the gas-vapor phase, a discharge side of the pump is connected to a liquid inlet of the liquid-gas jet apparatus, the separator is connected to a suction side of the pump and a pipeline for discharging a compressed gas is connected to the separator;

further comprising a jet pump having an active nozzle connected to the pipeline for bleeding the at least one liquid fraction, an inlet of an evacuated medium connected to an outlet of the liquid-gas jet apparatus and an outlet connected to the separator.

2. The plant according to claim 1, further including an additional pump having a suction side connected to the separator and a discharge side connected to the active nozzle of said jet pump.

\* \* \* \* \*